United States Patent Office
3,483,932
Patented Dec. 16, 1969

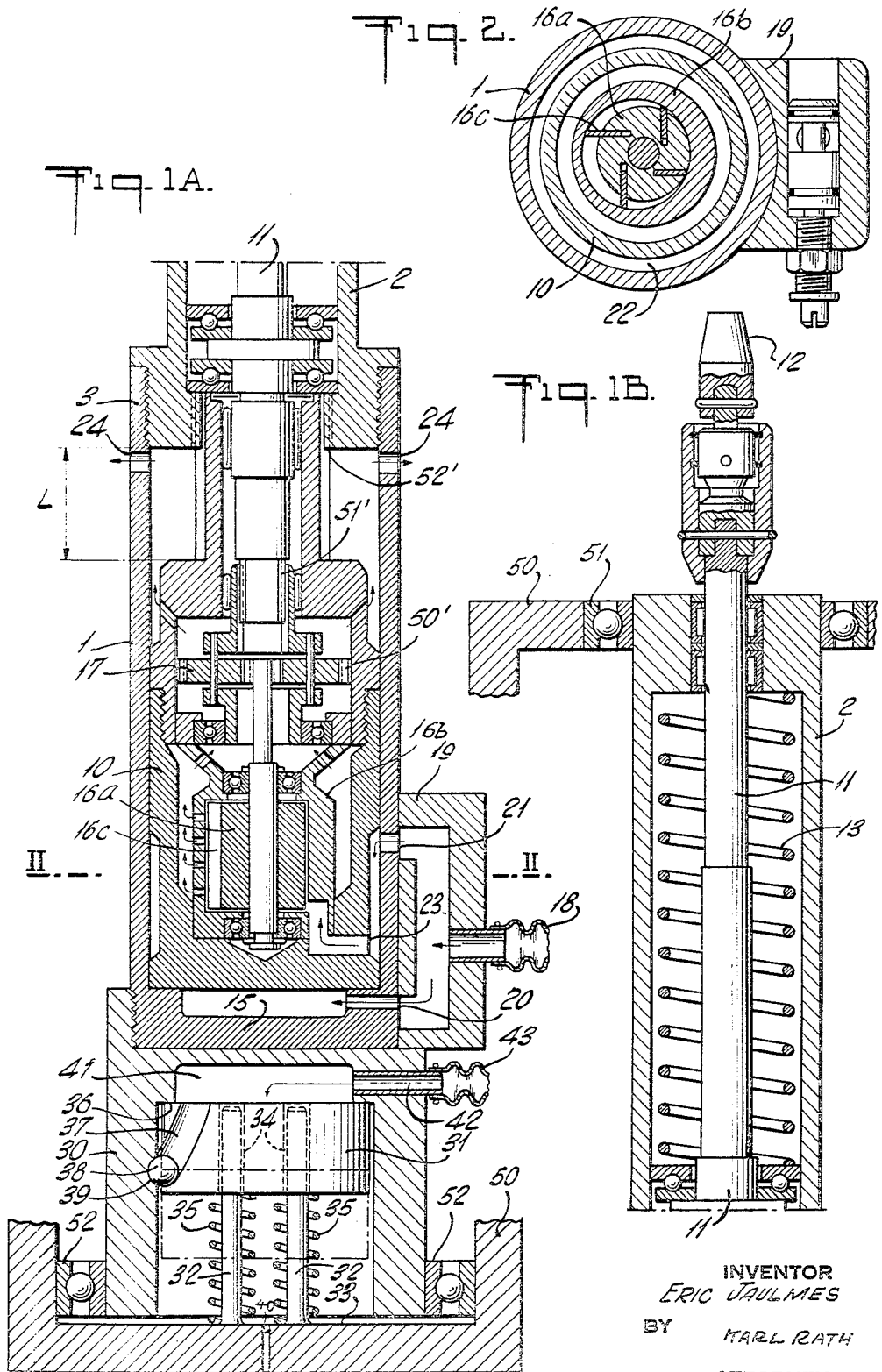

3,483,932
FLUID PRESSURE OPERATED VANE MOTOR, ESPECIALLY FOR NUT AND THE LIKE DRIVING MACHINES
Eric Jaulmes, Paris, France, assignor to Ateliers de la Motobecane, Societe Anonyme, Seine-Saint-Denis, France
Filed Apr. 15, 1968, Ser. No. 721,503
Claims priority, application France, Apr. 17, 1967, 102,931
Int. Cl. E21c 5/08; F01b 13/00
U.S. Cl. 173—12
9 Claims

ABSTRACT OF THE DISCLOSURE

A fluid pressure operated vane motor, suitable especially for use as driving means for nuts, screws and the like workpieces offering increasing load resistance in proportion to the displacement thereof and being of the type including a rotor having a plurality of spring-loaded radially slidable vanes, an eccentric hollow cylindrical stator having an interior surface enclosing said rotor in sliding engagement with said vanes, to provide pockets of varying volume enclosed by said vanes and surface, and inlet and outlet means of said stator for passing therethrough a pressurized fluid to rotate said rotor in a predetermined running direction, is fitted with means to intermittently rotate said stator, normally urged in the direction opposite to the rotor running direction to a limit position, through predetermined angular displacements from said limit position, whereby to cause the rotor, upon stoppage of the motor by its driving force balancing the load resistance, to apply additional force increments to the load, to thereby enable a substantially full equalization of the motor driving and load resistance forces or torques. The invention has special use in the tightening of the tensioning nuts of automobile, motorcycle and the like spoked wheels, to produce substantially equal spoke tensions.

---

The present invention relates generally to pressurized fluid operated vane motors, more particularly, though not limitatively, to motors of this type designed for the driving of nuts, screws and the like workpieces offering increasing load resistance in proportion to the displacement thereof, whereby the motor is stopped upon reaching of a predetermined force difference between the load resistance and the applied driving force.

As is well known, motors of the foregoing type comprise essentially a rotor fitted with a plurality of radially slidable vanes, an eccentric hollow cylindrical stator having an internal surface enclosing said rotor in fluid-tight sliding engagement with said vanes, to provide pockets of varying volume enclosed by said vanes and surface. As a consequence, passage of a pressurized fluid medium, such as compressed air, through said stator, provided with suitable inlet and outlet means, will result in the rotor to rotate with a substantially constant driving force or torque and in a predetermined running direction, or direction of increasing volume of said pockets between said inlet to said outlet means.

While the invention will be described in the following with specific reference to a nut driving machine for the tightening of the tensioning nuts of a spoked automobile, motorcycle or the like wheels, the improved machine has other uses in conjunction with devices for driving equivalent workpieces or loads, as will become more apparent as the description proceeds.

In order to obtain a perfect spoked wheel, that is to say a wheel which is perfectly centered radially and has no lateral wobble, it is merely necessary in practice to ensure that all the spokes have the same tension, provided of course that the wheel rim is geometrically correct, as will be assumed in what follows.

However, where a wheel is centered in a known manner by mounting it on a jig and then adjusting the tensions of the different spokes, by screwing up or loosening the individual spoke nuts until the wheel "rotates true," this does not necessarily result in equal tensions in all the spokes.

Besides, this method is empirical and tedious, it takes a long time and requires very specialized operators. There have therefore already been developed dynometric nut drivers which tighten each nut with the same torque. Here again the spokes are not all given the same tension, because the resistance against the applied torque depends to some extent on the gap between the thread of the nut and the thread of the spoke, and also on the friction between the nut and the wheel rim, as well as on the losses of the driving mechanism.

Accordingly, an important object of the present invention is the provision of a device of the referred to character which allows the spoke nuts to be tightened so as to obtain the same tension on all the spokes. What is obtained in this way is that all the spokes of the wheel operate under the same conditions. On the other hand, where a wheel has been centered by manual tightening of the spokes, the tensions vary between one spoke and another and the spokes do not operate equally, even though the wheel may "rotate true."

According to the present invention, a machine for applying a torque to a rotary member, such as a nut driver, etc., has a first part for applying torque to the member to rotate the same in a predetermined sense, a second part, and an operative connection between the first part and the second part constructed to enable the second part to impart incremental rotations to the first part and thereby additionally rotate the member in said predetermined sense, upon the stoppage of the machine by its driving force equalling to total load resistance.

The invention, both as to the foregoing and ancillary objects as well as novel aspects thereof, will be better understood from the following detailed description of a preferred form of pneumatic nut driver, taken in conjunction with the accompanying drawing forming part of this specification in which:

FIGS. 1A and 1B collectively represent a longitudinal section through the pneumatic nut driver; and
FIG. 2 is a cross-section along the line II—II in FIG. 1.

Like reference numerals denote like parts in the different views of the drawing.

Three are already known pneumatic nut drivers in which a pneumatic displacement vane motor drives, through a planetary reduction gear, a spindle whose tip engages with the nut to be tightened. The nut driver is itself in the form of a piston in a pneumatic cylinder, in which it slides longitudinally. The compressed air is fed to a distributor chamber from which a first passage leads to said cylinder, on the one hand, while a second air passage from the distributor chamber feeds compressed air to the vane motor, which rotates and drives the nut in the tightening direction until the total torque resistance of the nut becomes equal to the torque applied by the motor, whereupon the motor ceases to rotate. At this instant, the feed of compressed air is interrupted and a return spring returns the nut driving assembly to its initial position. In the tensioning of spoked wheels, a nut driver of this kind is provided for each spoke nut and all the nut drivers operate at the same time. Nut driving machines of this kind give a high output but they do not result in equal tensions of all the spokes for the reasons mentioned above, in that they merely apply the same (motor) torque to each nut.

Such a nut driver, embodying the improvement according to the present invention, is shown in the drawings, the body of which consists essentially of two substantially cylindrical parts 1 and 2 joined together at 3 to form a cylindrical housing. In this cylindrical housing there rotates and also slides longitudinally a nut driving assembly consisting essentially of a piston 10, a rotary spindle 11 having a tip 12 which engages with the nut to be tightened. A coil spring 13 serves to return the nut driving assembly to its initial position as shown in the drawing, in which position the piston 10 is retracted into contact with the bottom 14 of the cylinder 15 of the part 1 of the cylindrical housing.

The piston 10 carries a displacement vane motor comprising a rotor 10a and an eccentric hollow cylindrical stator 10b fast upon said piston and enclosing said rotor, said rotor being fitted with a plurality of spring-loaded radially slidable vanes 10c engaging the interior surface of said stator. The latter is provided with suitable inlet and outlet means or openings for the passing therethrough of a pressurized fluid, as indicated by the arrows in the drawing, whereby to rotate the rotor 10a in a predetermined direction, in the manner pointed out hereinabove. Interposed, in the example shown, between the rotor shaft and spindle 11 is a planetary or epicyclic gear drive whose outer ring gear 50' is supported by the piston 10 and whose planetary carrier has its output shaft coupled with said spindle by a groove and key connection 51', while the piston 10 is prevented from rotating by splines 52' connecting the same with the housing part 3.

The compressed air is fed through a connection 18 into a chamber 19 which communicates, through a first duct 20, with the lower part of the cylinder 15 and, through a second duct 21 and constricted passage 22, with an inlet passage 23 for the vane motor. Exhaust air from the motor escapes through the outlet ports 24 in housing part 1, the longitudinal stroke of the nut driving assembly being indicated at L in FIG. 1A.

Compressed air in the cylinder 15 pushes the nut driving assembly upwards in the cylinder so as to engage the tip 12 with the nut to be tightened. The vane motor is at the same time rotated so as to screw up the nut until rotation is stopped as described above. At this instant the supply of compressed air through the connection 18 is interrupted by any suitable means, with the result that the coil spring 13 returns the nut driving assembly to its initial position so as to allow the wheel to be removed from the machine at the end of a spoke tightening operation and to be replaced by another wheel.

In nut drivers of the kind mentioned above, the torque applied by the vane motor has to overcome not only the torque resistance of the spoke nut but also the frictional torque resistance arising from internal friction in the nut driver itself (ball-bearings, epicyclic reduction gear and the like). As a consequence, the process of tightening the nut stops automatically as soon as the opposing torque resistance, which is composed of the two parts mentioned above, becomes equal to the torque applied by the vane motor, taking into account of course the effect of the reduction gear.

With a machine according to the invention, an extra torque increment can be applied to the nut, after the tightening operation described above has been completed. This is achieved by rotating the body of the nut driver, and with it the stator 10b of the vane motor, through a certain angle, in the direction of tightening the nut, while still feeding compressed air to the vane motor. Under these conditions, the vane motor rotates with the body of the nut driver as though the two parts are a single piece, and the torque applied to the nut is the sum of the torque applied by the vane motor (taking into account the effect of the reduction gear) and the frictional torque due to internal friction between the parts of the nut driver. In this way the nut is driven tighter through a certain extra angle.

In other words, in a machine of the known kind, in which the body of the nut driver is fixed or remains stationary, the highest torque that can be applied to the spoke nut is $C-c$, wherein $C$ is the torque applied by the vane motor and $c$ is the frictional torque in the driving mechanism. On the other hand, in the improved machine according to the present invention in which the body of the nut driver is also rotated, there is applied to the spoke nut a total torque of $C+c$. A machine of this second kind, that is to say in which the body of the nut driver can also be rotated, provides the great advantage that an extra tightening torque can be applied to the spoke nut to give it a final tightening. The amount of this extra torque is limited but constant and the arrangement has the great practical advantage that the extra torque can be applied, to a nut upon stoppage of the driving machine, whenever desired merely by rotating the body of the nut driver in the rotating direction of the vane motor, or direction, of tightening the nut.

Furthermore, as soon as the body of the nut driver, that is to say the stator of the vane motor, is rotated back again, in the direction of loosening the nut, or opposite to the motor rotating direction, while still feeding compressed air to said motor, the equivalent of a ratchet action is obtained in that the rotor of the vane motor remains stationary, while the body of the nut driver is rotated backwards. As a consequence, the nut is not loosened. On the contrary, there is relative rotation between the rotor and the stator of the vane motor so that, although the body of the nut driver rotates in the direction of loosening the nut, the rotor of the vane motor, and the tip of the spindle which engages with the spoke nut, and the nut itself, all remain stationary. During this return movement, a certain amount of forward torque is still applied to the nut, but less than was applied before. The amount of the return torque which has to be applied to the body of the nut driver is very little and can easily be supplied by a return spring.

The sequence of movements, in providing a kind of pneumatic ratchet effect, may be summarized as follows. First the extra tightening device, being fixed to the body of the nut driver, remains stationary while the nut is screwed up by a certain torque applied to it. The extra tightening device and, in turn, the body of the nut driver is then itself rotated in the tightening direction, thus screwing the spoke nut up a little tighter. The extra tightening device and with it the body of the nut driver is then rotated in the opposite or loosening direction, while the nut remains stationary. In this way there is obtained a ratchet action without this involving the use of any special or extra mechanical device.

This process can be used with advantage for example in nut driving machines in which all the spoke nuts are first given a preliminary tightening under a certain applied torque and then tightened up further by a series of successive fractional operations with no corrective loosening being used at any stage of the process. A method of this kind is described for example in U.S. Patent application No. 708,412, filed by the present applicant on Feb. 26, 1968, entitled Process of and Machine for Centering Spoked Wheels.

The present invention, applied to the process of nut tightening mentioned above, provides means for rotating the stator of the vane motor, or rotating the extra tightening device (the body of the nut driving head) after stoppage of the driving motor, so as to tighten the nut through an extra angle, as described above, by the forward movement of a ratchet action.

The further rotation provided for by the present invention can be imparted to the nut driver by any suitable means. In the example shown by the drawings, this means takes the form of a control head comprised of a cylinder 30 directly fixed to the body 1 of the nut driver. The cylinder 30 contains a piston 31 capable of sliding longitudinally incapable of rotating within said cylinder. For this purpose, the piston 31 slides longitudinally on pins 32 mounted in the bottom 33 of the frame 50 of the nut driving machine. The pins 32 pass through bores or drillings 34 in the piston. Around the pins 32 there are coil springs 35 mounted between the piston 31 and the bottom 33. The springs 35 tend to push the piston 31 up to its highest or limit position, as shown in the drawing, in which position the upper surface of the piston rests in contact with shoulders 36 of the cylinder 30. The periphery of the piston 31 is formed with several helical grooves 37 in each of which engages a ball 38 which is housed in a recess 39 in the inner wall of the cylinder 30. The bottom 33 of the machine frame 50 has a vent drilling 40 communicating with the ambient atmosphere. The upper part 41 of the cylinder 30 is fed with compressed air through a connection 43, 42. The compressed air pushes the piston downwards into the position shown in dot-dash lines.

In view of the fact that the nut driver as a whole must rotate, the air inlet connections 18 and 43 must be attached to a flexible air hose, and the nut driver shown in the drawing is mounted for rotation in the frame 50 of the machine in ball bearings 51 and 52.

The supply of compressed air through the connections 18 and 43 may be controlled by an error signal in the case where a wheel spoke is being tensioned as described in the above-mentioned patent application, but the pressure is held back from connection 43 by suitable means until the nut has been tightened by the vane motor alone as described above.

In operation compressed air fed through the connection 43 pushes the piston 31 downwards, the piston being prevented from rotating by the guide pins 32. The balls 38, following the helical grooves 37, give the cylinder 30 a rotation, in the direction of tightening up the spoke nut, through a certain extra angle. As soon as the supply of compressed air through the connections 18 and 43 is interrupted at the end of the extra tightening step, the nut driving assembly 10, 11, 12 returns to its initial position under the influence of the return spring 13, the piston 31 at the same time returning to its top position under the influence of the return springs 35. During this return movement, the cylinder 30 is rotated back again, by the action of the balls 38, and the body of the nut driver is also rotated back into its initial position.

The stroke of the piston 31, and the pitch of the grooves 37, are chosen so as to give the body of the nut driver a rotation through an angle of for example 30°, as required by the patent application mentioned above, which requires that the body of the nut driver be given several successive rotations, each through a small angle only. These successive rotations impart to the spoke nut a number of incremental tightening steps, provided that no torque greater than $C+c$ is required.

As will be understood, the invention is not limited to the application of the particular kind of pneumatic nut driver described for illustration, nor is it limited to the details of the control head described here. In particular the pins 32 can if desired be replaced by a grooved central shaft having a cross-section corresponding to that of a hole in the piston.

Furthermore the pneumatic actuation described here, and represented in the figures, can if desired be replaced by hydraulic or electric actuation, in which case the vane motor 16 is replaced by an appropriate kind of motor, and the cylinder 30 can for example be replaced by a solenoid. Other means are possible for rotating the body of the nut driver, or even for rotating only the stator of the vane pump. Furthermore, the invention can be applied to the screwing up of other mechanical parts, other than wheel spokes.

I claim:
1. A pressurized fluid vane motor including a rotor having a plurality of spring-loaded radially slidable vanes, an eccentric hollow cylindrical stator having an interior surface enclosing said rotor in sliding engagement with said vanes, to provide pockets of varying volume enclosed by said vanes and surface, and inlet and outlet means of said stator for passing therethrough a pressurized fluid, to rotate said rotor in a predetermined direction, the improvement comprising in combination:
   (1) a support,
   (2) mounting means rotatively supporting said stator by said support,
   (3) stop means,
   (4) resilient means to urge said stator in the direction opposite to said predetermined direction into engagement with said stop means, and
   (5) control means to effect predetermined intermittent rotary displacements to said stator in the rotating direction of said rotor and against the action of said resilient means.

2. In a pressurized fluid motor as claimed in claim 1, said mounting means being comprised of a cylinder rigid with said stator and rotatively mounted upon said support, a spring-loaded piston disposed in axially slidable but non-rotative relation within said cylinder and normally urged to a limit position, and means to convert displacements of said piston into rotary movement of said cylinder, and said control means consisting of means to apply a pressurized fluid to said cylinder, to temporarily displace the same from said limit position.

3. In a pressurized fluid motor as claimed in claim 2, including further means to limit the displacement of said cylinder from said limit position, to result in predetermined intermittent angular displacement of said stator.

4. In a pressurized fluid motor as claimed in claim 1 designed for use with loads offering increasing resistance in proportion to the displacement thereof by said motor, whereby to result in stoppage of said motor upon reaching of a predetermined force difference between the load resistance and the motor driving forces, wherein said stator displacements are of a value to result in incremental load resistances being a fraction of said predetermined force difference.

5. A machine for the driving of nuts, screws and the like workpieces comprising in combination:
   (1) a driving assembly including
      (a) a cylinder,
      (b) a piston disposed in axially movable and non-rotative relation within said cylinder,
      (c) a pressurized fluid vane motor having a stator rigid with said piston and a rotor having a predetermined running direction, and
      (d) a driving spindle having a workpiece engaging head and coupled with said rotor,
   (2) means to supply a pressurized fluid medium simultaneously to said motor and said cylinder, to rotate said head in the running direction of said motor and to displace the same axially by said piston,
   (3) a support,
   (4) mounting means rotatively supporting said cylinder by said support,
   (5) stop means,
   (6) resilient means to urge said stator in a direction opposite to said motor running direction into engagement with said stop means, and
   (7) control means to supply predetermined intermittent rotary displacements to said stator in the running direction of said motor and against the action of said resilient means.

6. In a driving device as claimed in claim 5, said mounting means being comprised of an auxiliary cylinder rigid with said first cylinder and rotatively mounted upon said support, an auxiliary spring-loaded piston disposed in axially slidable but non-rotative relation with said auxiliary cylinder and fitted with means to urge the same to a limit position, and means to convert displacement of said auxiliary piston into rotary movement of said auxiliary cylinder, and said control means consisting of means to apply pressurized fluid to said auxiliary cylinder, to temporarily displace said auxiliary piston from said limit position.

7. In a driving device as claimed in claim 5, said mounting means being comprised of an auxiliary cylinder rigid with said first cylinder and rotatively mounted upon said support, an auxiliary spring-loaded piston disposed in axially slidable but non-rotative relation with said auxiliary cylinder and fitted with means to urge the same to a limit position, and helical groove and ball coupling means between said auxiliary piston and said cylinder, to convert dispacement of said auxiliary piston into rotary movement of said auxiliary cylinder, and means to apply pressurized fluid to said auxiliary cylinder, to temporarily displace said auxiliary piston from said limit position.

8. In a drving device as claimed in claim 5, including a planetary reduction gearing interposed between said spindle and said rotor with its inner sun gear connected to said rotor, with its outer ring gear supported by said cylinder and with its planetary carrier rotatively supported by said cylinder and connected to said spindle.

9. In a driving device as claimed in claim 5, including means to limit the displacements of said stator, to result in corresponding additional incremental load resistance increases equal to a fraction of the force difference between the motor driving force and the load resistance at the instant of stoppage of the motor at the end of a driving operation.

References Cited

UNITED STATES PATENTS 2,893,278   7/1959   Rice _____ 81—52.4
2,952,176   9/1960   Mitchel _____ 81—52.4

FOREIGN PATENTS 813,728   5/1959   Great Britain.

ERNEST R. PURSER, Primary Examiner

U.S. Cl. X.R.

81—52.4, 57; 91—61; 173—159